Sept. 25, 1928.
J. S. DONNELLAN
1,685,533
SLICING CUTTER FOR BUTTER, BREAD, AND THE LIKE
Filed March 9, 1927
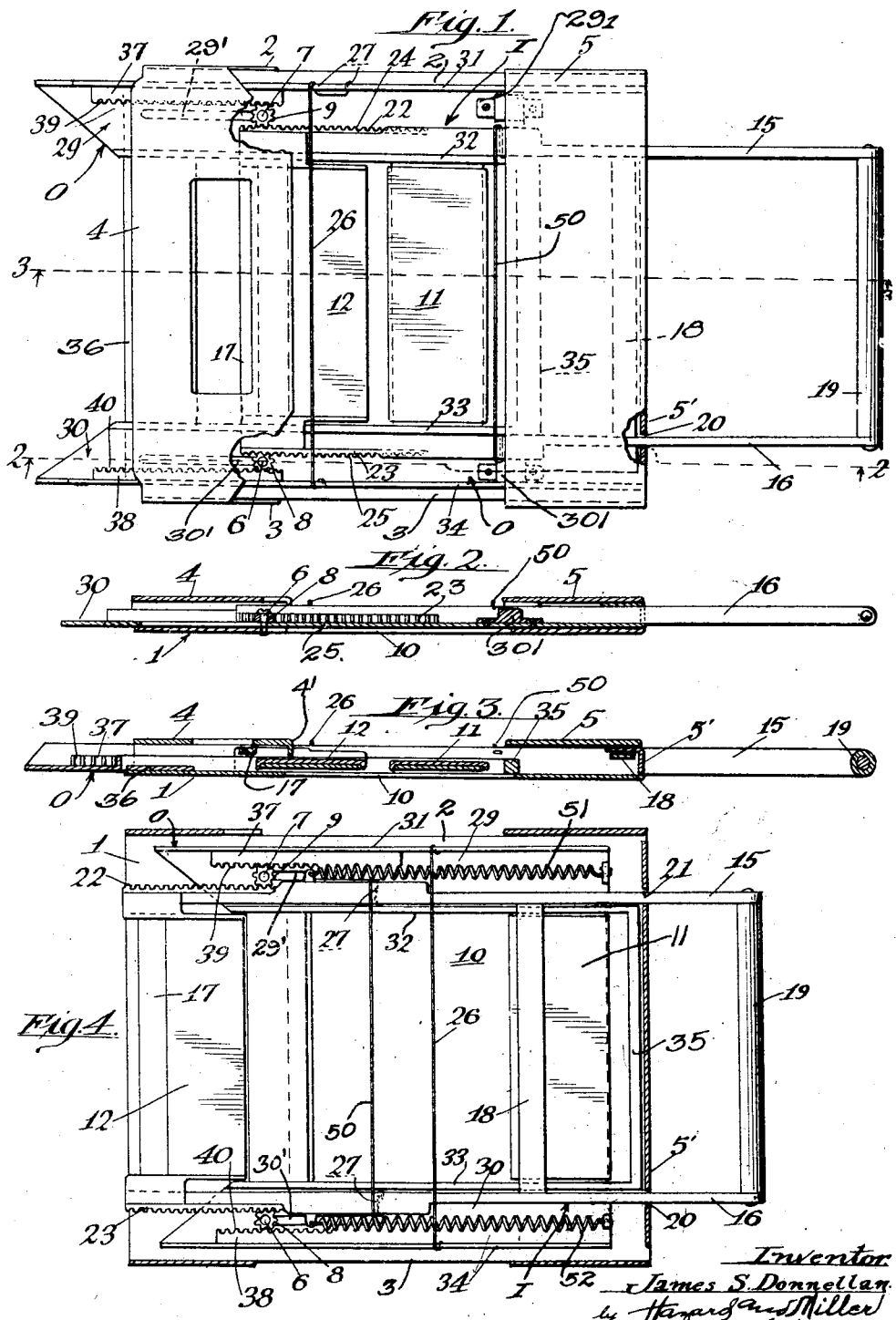
Inventor
James S. Donnellan
by Hazard and Miller
Attorneys Patented Sept. 25, 1928.

1,685,533

UNITED STATES PATENT OFFICE.

JAMES S. DONNELLAN, OF LOS ANGELES, CALIFORNIA.

SLICING CUTTER FOR BUTTER, BREAD, AND THE LIKE.

Application filed March 9, 1927. Serial No. 173,953.

This invention relates to slicing cutters for butter, bread and the like, and it is an object of my invention to provide a cutter which is an improvement on the cutter shown and described in my co-pending application for Letters Patent, Serial No. 149,932, filed November 22, 1926.

A still further object of this invention is to provide a slicing cutter for butter, bread and the like, which is adapted to cut a solid column of material placed on the same into small slices and dispense the same.

A still further object of my invention is to provide a device which is strong and durable in its operation, has relatively few mechanical moving parts, is unlikely to get out of order and which is well adapted to perform the services required of it.

A still further object of my invention is to provide a device which will efficiently cut butter and separate the portions cut from the butter so that they will not have a tendency to stick together.

With the foregoing and other objects in view which will be made manifest in the following detailed description and specifically pointed out in the appended claims, reference is had to the accompanying drawings for an illustrative embodiment of the invention, wherein:

Figure 1 is a plan view of my slicing machine showing certain operative parts broken away to more closely reveal the nature of my invention.

Figure 2 is a sectional view taken substantially along the line 2—2 of Figure 1.

Figure 3 is a sectional view taken along the line 3—3 of Figure 1, and

Figure 4 is a view similar to the showing in Figure 1, showing my cutter of a slightly modified form and having top straps 4 and 5 removed for better illustration, in actual operation, performing the cutting operation on a bar of butter.

In the accompanying drawings forming a part of this specification, like characters of reference designate like parts throughout, and my improved butter-slicing machine comprises a base plate 1, having a pair of side flanges 2 and 3 and a pair of relatively wide straps 4 and 5 having downwardly extending flanges which are bolted, soldered or secured in any suitable manner to the side flanges 2 and 3 so as to lie in spaced parallel relation with respect to said base plate, one end of the base plate 1 being provided with a closure 5'. The base plate 1 has extending upwardly therefrom on either side of the same, a pair of rigid pintles 6 and 7 on which are rotatably mounted a pair of pinions 8 and 9. The base plate 1, straps 4 and 5 and the pintles 6 and 7 and end closure 5' form the stationary portion of my device. All other elements of my device are slidable. A substantially square aperture 10 extends through the center of the base plate 1. A plurality of doors 11 and 12 are adapted to close or open over the aperture 10. The doors 11 and 12 when closed, occupy a position adjacent each other in the center of the aperture, and when open occupy remote positions at either end of the base plate uncovering the aperture. The door 11 shown in Figure 1 is adapted to move to the right of the figure and the door 12 is adapted to move to the left. These doors are operatively connected together so that the operation of one of them will automatically operate the other. In the description, I will describe first the door 12 and its operative associated parts, and then I will proceed with the description of the door 11 and its operative associated parts. I will then describe the operative connection between the doors 11 and 12 and their respective operative associated parts, and in conclusion I will point out distinctly and clearly how my device operates.

The end closure 5' is provided with a pair of slots 20 and 21, and a substantially rectangular inner frame designated in general by the letter I having side bars 15 and 16, an end bar 17, a cross bar 18 and a handle 19 is disposed between the straps 4 and 5 and the base plate 1. The side bars 15 and 16 extend through the slots 21 and 20 in the end closure 5', and are guided at their other end by the pinions 9 and 8. A pair of parallel racks are formed externally on the side bars 15 and 16 adjacent the end opposite the handle 19. These racks are designated at 22 and 23 and have teeth 24 and 25 adapted to engage the teeth on the pinions 9 and 8 so that the pinions will rotate and the frame will slide between the same. Extending across the frame between the side bars 15 and 16 is a cutting wire 50. This cutting wire may be formed of any strong material such as steel or the like, but I prefer to use a platinum wire as the same has a considerable tensile strength and is not effected by erosion as is the case with steel. The manner in which the wire is attached to the side bars 15 and 16 is immaterial. It may be welded, brazed or secured in any manner. However, I prefer to provide small apertures 27 in the side bars and pass the wire through them. The wire may be heated when inserted in the apertures and allowed to cool so that the contraction of the same will stretch them tightly across the frame. A second and more complicated frame structure is adapted to slide within the base plate 1 and between the same and the overlying straps 4 and 5. This structure comprises a substantially rectangular outer frame, designated by the letter O the sides of which are in the form of channel irons 29 and 30, provided with slots 29' and 30' respectively through which the pintles 7 and 6 of the pinions 9 and 8 extend, having side flanges 31, 32, 33 and 34 respectively, and end bars 35 and 36. The opposing flanges 32 and 33 extend upwardly on the inside of the side bars 15 and 16, and the door 12 is under-slung from the side bars 15 and 16 to occupy a position on the level with the door 11, which extends between and is rigidly secured to flanges 32 and 33 of the outer frame O. The side flanges 31 and 34 are remote flanges and extend upwardly on the outer side of the side bars 15 and 16. A pair of racks 37 and 38 secured to channel irons 29 and 30 of the outer frame O and having teeth 39 and 40 act as guides, and the teeth of the same engage the pinions 9 and 8. Securely mounted on the channel irons 29 and 30 of the outer frame O are guide blocks 291 and 301 respectively which assist in guiding the side bars 15 and 16 respectively in their reciprocal movements. A second cutting wire 26 is disposed between the outer side flanges 31 and 34 of the outer frame O, and is secured in a manner similar to the cutting wire 50. The operative connections between the two frames I and O which move in opposite paths, consist simply of the two pinions 8 and 9, and they constitute practically the only operative association either of these frames has with the other at any point.

I will now describe in detail the operation of my device. My device is adapted to slice bread, butter or in fact any soft material capable of being sliced. For the purposes of description, it will be assumed that a slice of butter in the form of the conventional quarter-pound package widely known and used, is to be sliced. The handle 19 is pulled outwardly from the base plate 1 and the doors 11 and 12 occupy a position covering the aperture 10 in the base plate 1. The butter is inserted or is set to rest with one end of the bar resting on these doors. As the handle is pushed inwardly, the racks 22 and 23 serve to rotate the pinions 9 and 8, and the pinions in turn move the racks 37 and 38 in a direction opposite the racks 22 and 23. The doors 11 and 12 are thus separated and the butter resting on the same travels with the door on which it has most traction. But the cutting wires 50 and 26 are brought together as shown in Fig. 4 and the butter traveling with one of the doors 11 and 12, engages the cutting wire approaching it and is forced toward the center of the aperture. The cutting wire then engages the butter and since the cutting wires are spaced about a quarter of an inch or less from the doors, they pass through the butter this distance from the bottom of the bar. As they cross each other they contact or nearly so, and the weight of the slice cut is sufficient to cause the same to release its plastic engagement with the wires and the same drops from the wires. The wires completely pass each other and assume the position shown in Figure 4, and the remainder of the uncut bar of butter rests upon the wires 26 and 50. The construction of the cutter shown in Fig. 4 is identical with those shown in Figs. 1, 2 and 3, with the exception that I provide coil springs 51 and 52 connecting the bars 15 and 16 of the inner frame I with the outer frame O. These springs tend to pull the frames together so that the doors 11 and 12 will occupy the position shown in Fig. 1, thus facilitating the operation of the handle 19. When the handle is again pulled out, the wires 26 and 50 separate with the butter sliding on them, but when they have sufficiently separated so that they release their engagement with the bar of butter, the doors are sufficiently close to each other to support the bar of butter which drops upon the doors, and the operation is continuous until the last slice of butter has been cut. The cross bar 18 in addition to strengthening the frame, comes to the edge of the aperture 10 when the handle is pushed in, thereby preventing any butter from traveling into the space between the strap 5 and the base plate. Similarly, a downwardly extending flange 4' on the strap 4 prevents butter from entering space between the strap 4 and the base plate 1. My device is a considerable improvement over the butter-cutting machine illustrated in my co-pending application, Serial No. 149,932, filed November 22, 1926. Butter sliced by this improved slicer is even in its appearance, and the rate at which butter may be sliced is determined by the speed with which the operator is enabled to operate the handle.

In view of the fact that a thin, platinum wire is not well adapted to slice bread, suitable sharp knife blades may be subsituted in place of these wires when the details of construction are to be so modified as to enable my device to be efficiently used in slicing bread.

It will be understood that various changes in the detail of construction may be made without departing from the spirit or scope of the invention as defined by the appended claims.

I claim:

1. A slicing machine comprising in combination a slidable door, a slidable cutter spaced from said door and means for moving said door and cutter simultaneously in opposite directions, whereby material placed on said door may be sliced and dispensed.

2. A slicing machine comprising in combination a pair of slidable doors, a pair of slidable cutters spaced from said doors and means for moving said doors and cutters so that said cutters approach each other as said doors separate, whereby material placed on said doors may be sliced.

3. A slicing machine comprising in combination a pair of slidable doors, a pair of slidable cutters spaced from said doors, and means for moving said doors and cutters so that said cutters separate as said doors approach each other, whereby material placed on said doors may be dispensed.

4. A slicing machine comprising in combination a pair of slidable doors, a pair of slidable cutters spaced from said doors, and means for moving said doors and cutters so that said cutters separate as said doors approach each other and vice versa, whereby material placed on said doors may be sliced and dispensed.

5. A slicing machine comprising in combination a base plate, a slidable frame in said base plate, a door and a cutter mounted on said frame, a second frame slidable in said base plate, a door and cutter mounted on said second frame, and an operative connection between said frames to cause them to travel in opposing directions, whereby said doors and said cutters may be brought together or separated as and for the purpose specified.

6. A slicing machine comprising in combination a base plate having an aperture therethrough, a frame slidable in said base plate, said frame having thereon a cutter and a door, a second frame slidable in said base plate, having a door and a cutter thereon, there being an operative connection between said frames to cause them to travel in opposed paths, whereby said doors may be brought together over said aperture or removed therefrom, and said cutters may be brought together above said aperture or removed therefrom.

7. A slicing machine comprising in combination a base plate, a frame slidable in said base plate, a cutter on said frame, a rack on said frame, a pinion mounted on said base plate engageable with said rack, a second frame having a door and a cutter thereon and a rack engageable with said pinion, whereby the motion of said frames with respect to said base plate may be opposed, an opening in said base plate and a handle on one of said frames for sliding the same as and for the purpose specified.

8. A slicing machine comprising in combination a base plate having upstanding side flanges, straps overlying said base plate, rigid pintles mounted in said base plate, pinions mounted for rotation on said pintles, an aperture in said base plate, a frame slidable in said base plate, said frame having side bars, an end bar, a cross bar and a handle, a rack mounted on said side bars engageable with said pinions, said pinions serving to maintain and guide said frame in its slidable path, a door and a cutter on said frame, a second frame having side channels and end cross bars, a door and a cutter on said second frame, racks on said side channels engageable with said pinions, whereby motion of said handle will impart opposed motion to said frames, and said doors and said cutters may selectively be brought together above said aperture, and material placed on said doors will be cut and dispensed.

9. A slicing machine comprising a pair of frames slidable in opposite directions, cutters mounted on said frames disposed in adjacent parallel planes and adapted to pass each other when said frames move toward each other, spring means tending to move said frames toward each other, and means to operate said frames.

In testimony whereof I have signed my name to this specification.

JAMES S. DONNELLAN.